United States Patent
Chang et al.

[11] Patent Number: 6,081,806
[45] Date of Patent: Jun. 27, 2000

[54] COMPUTER DATABASE SYNCHRONIZATION METHOD

[75] Inventors: Ching-Sung Chang; Shih-Kuang Tsai; Dai-Shui Ho, all of Taipei, Taiwan; Xu-Jun Qiu, Shanghai, China

[73] Assignee: Inventec Corporation, Taipei, Taiwan

[21] Appl. No.: 09/007,467

[22] Filed: Jan. 15, 1998

[51] Int. Cl.[7] .................................................. G06F 17/30
[52] U.S. Cl. .............................. 707/8; 707/201; 707/203; 707/204
[58] Field of Search .................................. 706/45; 707/8, 707/201, 202, 204, 3, 203

[56] References Cited

U.S. PATENT DOCUMENTS

| | | |
|---|---|---|
| 4,714,995 | 12/1987 | Materna et al. . |
| 5,280,612 | 1/1994 | Lorie et al. . |
| 5,307,487 | 4/1994 | Tavares et al. . |
| 5,317,729 | 5/1994 | Mukherjee et al. . |
| 5,375,234 | 12/1994 | Davidson et al. ............ 707/202 |
| 5,404,508 | 4/1995 | Konrad et al. ............... 707/202 |
| 5,471,629 | 11/1995 | Risch . |
| 5,535,407 | 7/1996 | Yanagawa et al. . |
| 5,592,660 | 1/1997 | Yokota et al. ................. 707/8 |
| 5,615,364 | 3/1997 | Marks ........................ 707/202 |
| 5,701,400 | 12/1997 | Amado ........................ 706/45 |
| 5,710,922 | 1/1998 | Alley et al. .................. 707/201 |
| 5,758,355 | 5/1998 | Buchanan .................... 707/201 |
| 5,926,816 | 7/1999 | Bauer et al. .................. 707/8 |
| 5,943,676 | 8/1999 | Boothby ...................... 707/201 |

*Primary Examiner*—Wayne Amsbury
*Assistant Examiner*—Thuy Pardo
*Attorney, Agent, or Firm*—Foley & Lardner

[57] ABSTRACT

In a computer database synchronization method, a first database with first object data and a second database with second object data are established in a personal computer and an electronic dictionary, respectively. First and second synchronization status tables are established for each of the first and second object data, respectively. The synchronization status tables are modified from a first state, indicating that the corresponding object data is synchronized with the first or second database, to a second state, indicating that the corresponding object data is not synchronized with the first or second database, when the corresponding object data is edited. Synchronizing of the first and second databases can begin when a communications link is established between the personal computer and the electronic dictionary. During synchronizing, the personal computer retrieves the second synchronization status tables from the electronic dictionary, and compares the second synchronization status tables with the corresponding first synchronization status tables. Based on the results of the comparison, the personal computer retrieves the corresponding second object data from the electronic dictionary, and updates the first database with the retrieved second object data, or transmits the corresponding first object data to the electronic dictionary for updating the second database with the transmitted first object data.

6 Claims, 3 Drawing Sheets

COMPUTER DATABASE SYNCHRONIZATION METHOD

BACKGROUND OF THE INVENTION

1. Field of the Invention

The invention relates to a computer database synchronization method, more particularly to one which facilitates synchronization of databases of a personal computer and an electronic dictionary.

2. Description of the Related Art

Currently, most personal computers, such as desktop computers or portable computers, incorporate name card managing and calendar planning databases for organizing purposes. Electronic dictionaries having name card managing and calendar planning capabilities are also known in the art. Because of their small size, electronic dictionaries are more convenient to carry as compared to personal computers. As such, the databases of electronic dictionaries are generally updated or modified with greater frequency as compared to those of personal computers.

SUMMARY OF THE INVENTION

The object of the present invention is to provide a computer database synchronization method that facilitates synchronization of databases of a personal computer and an electronic dictionary.

Accordingly, the computer database synchronization method of this invention comprises:

establishing a first database with first object data in a personal computer, and a second database with second object data corresponding to the first object data in an electronic dictionary;

establishing a first synchronization status table for each of the first object data in the personal computer, and modifying the first synchronization status table from a first state, indicating that the corresponding first object data is synchronized with the second database, to a second state, indicating that the corresponding first object data is not synchronized with the second database, when the corresponding first object data is edited;

establishing a second synchronization status table for each of the second object data in the electronic dictionary, and modifying the second synchronization status table from a first state, indicating that the corresponding second object data is synchronized with the first database, to a second state, indicating that the corresponding second object data is not synchronized with the first database, when the corresponding second object data is edited;

establishing a communications link between the personal computer and the electronic dictionary; and synchronizing the first and second databases including controlling the personal computer to retrieve the second synchronization status tables from the electronic dictionary, and to compare the second synchronization status tables with the corresponding first synchronization status tables, when one of the first synchronization status tables is in the first state and the corresponding one of the second synchronization status tables is in the second state, controlling the personal computer to retrieve the corresponding one of the second object data from the electronic dictionary, and to update the first database with the corresponding one of the second object data retrieved from the electronic dictionary, and when one of the first synchronization status tables is in the second state and the corresponding one of the second synchronization status tables is in the first state, controlling the personal computer to transmit the corresponding one of the first object data to the electronic dictionary, and controlling the electronic dictionary to update the second database with the corresponding one of the first object data received from the personal computer.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
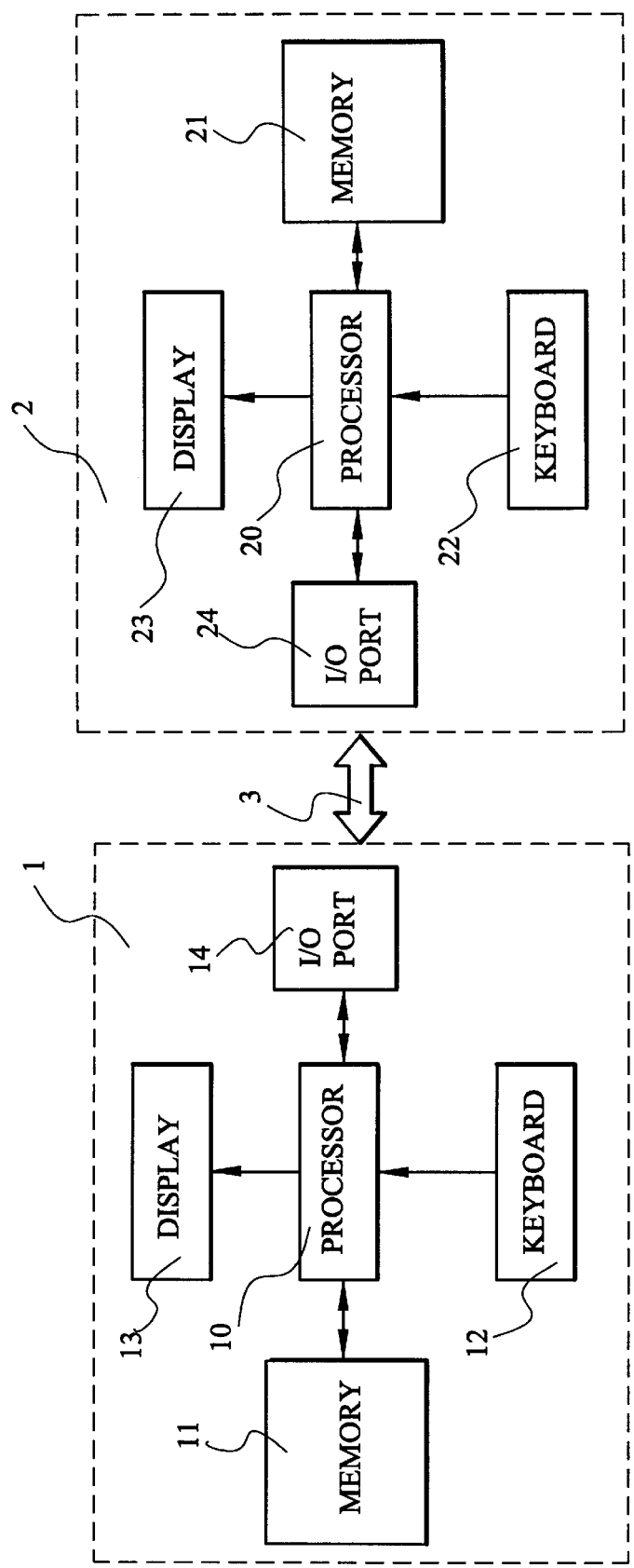
FIG. 1 is a schematic block diagram of a computer system for implementing the preferred embodiment of a computer database synchronization method according to the present invention.

Referring to FIG. 1, the preferred embodiment of a computer database synchronization method according to the present invention is implemented in a computer system that includes a personal computer 1, such as a desktop computer or a portable computer, and an electronic dictionary 2. The personal computer 1 includes a processor unit 10, a memory unit 11, a keyboard unit 12, a display unit 13 and an input/output port 14. The electronic dictionary 2 includes a processor unit 20, a memory unit 21, a keyboard unit 22, a display unit 23 and an I/O port 24. An interface 3 interconnects the I/O ports 14, 24 of the personal computer 1 and the electronic dictionary 2.

The memory unit 11 of the personal computer 1 has a first organizer software and a first synchronizer software stored therein. When executed by the processor unit 10, the first organizer software permits establishing of a first database in the memory unit 11, and editing, e.g. modifying, adding or deleting, of first object data in the first database.

The memory unit 21 of the electronic dictionary 2 has a second organizer software and a second synchronizer software stored therein. When executed by the processor unit 20, the second organizer software in the electronic dictionary 2 permits establishing in the memory unit 21 of a second database with second object data that correspond to the first object data of the first database, and editing, e.g. modifying, adding or deleting, of the second object data in the second database.

After an editing operation for either of the first and second databases has been performed, the processor units 10, 20 can be controlled so as to execute the first and second synchronizer softwares, respectively, for synchronizing the first and second databases in the memory units 11, 21.

The preferred embodiment will now be described in greater detail with reference to a name card managing database.

For the electronic dictionary 2, each time the second organizer software thereof is executed by the processor unit 20 to edit the second object data of the second name card managing database in the memory unit 21, the processor unit 20 also executes the second synchronizer software in the memory unit 21 to establish or modify a second synchronization status table corresponding to the edited second object data. The second synchronization status table is stored in the memory unit 21 and includes a database identifier (TYPE), a dictionary-assigned identifier (PID) assigned by the processor unit 20 to distinguish the corresponding second object data from the other second object data in the second name card managing database, and a status identifier (STATUS) for indicating whether the second object data is synchronized with the first name card managing database in the personal computer 1.

For the personal computer 1, each time the first organizer software thereof is executed by the processor unit 10 to edit the first object data of the first name card managing database in the memory unit 11, the processor unit 10 also executes the first synchronizing software in the memory unit 11 to establish or modify a first synchronization status table corresponding to the edited first object data. The first synchronization status table is stored in the memory unit 11 and includes a database identifier (TYPE) that corresponds to the database identifier (TYPE) of the corresponding second synchronization status table and that is used to distinguish the first name card managing database from other databases in the memory unit 11, a computer-assigned identifier (SID) assigned by the processor unit 10 to distinguish the first object data from the other first object data in the first name card managing database, the dictionary-assigned identifier (PID) of the corresponding second synchronization status table, and a status identifier (STATUS) for indicating whether the first object data is synchronized with the second name card managing database in the electronic dictionary 2.

The status identifier (STATUS) for each of the first and second synchronization status tables can be a CLEAN-SHARED identifier for indicating that the corresponding one of the first and second object data is synchronized, or a non-synchronized identifier for indicating that the corresponding one of the first and second object data is not synchronized. The non-synchronized identifier can be a DIRTY-SHARED identifier for indicating that the corresponding one of the first and second object data is a new or modified object data, or a DELETE identifier for indicating that the corresponding one of the first and second object data is a deleted object data.

The following commands are associated with the aforementioned status identifiers:

MODIFY—wherein the particular object data of one of the personal computer 1 and the electronic dictionary 2 is new or is modified, and the corresponding status identifier is changed from CLEAN-SHARED to DIRTY-SHARED;

UPDATE—wherein the new or modified object data of one of the personal computer 1 and the electronic dictionary 2 is synchronized with the corresponding object data of the other one of the personal computer 1 and the electronic dictionary 2, and the corresponding status identifier is changed from DIRTY-SHARED to CLEAN-SHARED;

INVALIDATE—wherein the particular object data of one of the personal computer 1 and the electronic dictionary 2 is deleted, and the corresponding status identifier is changed from CLEAN-SHARED to DELETE; and RESTORE—wherein the object data of the other one of the personal computer 1 and the electronic dictionary 2 corresponding to the deleted object data of one of the personal computer 1 and the electronic dictionary 2 is deleted, and the corresponding status identifier is changed from DELETE to CLEAN-SHARED.

By virtue of the first and second synchronization status tables, the synchronizing status of each object data in the first and second name card managing databases of the personal computer 1 and the electronic dictionary 2 can be inspected by the personal computer 1 so that the appropriate command can be executed to synchronize the first and second name card managing databases.

In the following illustrative examples, the personal computer 1 serves as a master computer, whereas the electronic dictionary 2 serves as a slave computer. In operation, the personal computer 1 requests for the second synchronization status table from the electronic dictionary 2 and, based on differences between the first synchronization table and the corresponding second tag table, controls the transmission of data between the personal computer 1 and the electronic dictionary 2 for synchronizing the first and second name card managing databases.

Figure 2:
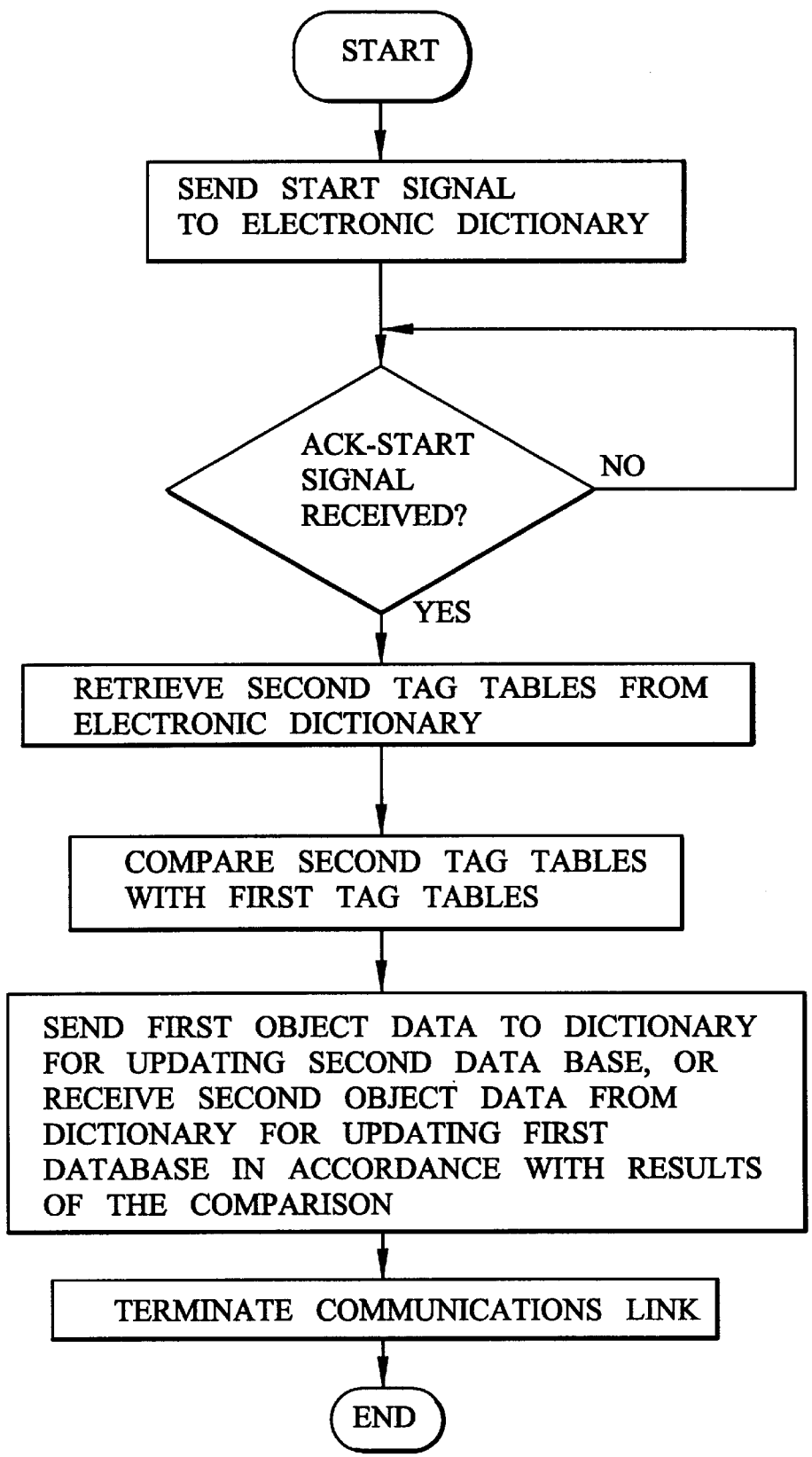
FIG. 2 illustrates the operation of a personal computer when first and second databases are synchronized according to the computer database synchronization method of this invention.

FIG. 2 illustrates the operation of the personal computer 1 when the first and second name card managing databases are synchronized according to the computer database synchronization method of this invention. When the first synchronizer software of the personal computer 1 is executed by the processor unit 10 while the interface 3 interconnects the personal computer 1 and the electronic dictionary 2, a handshaking procedure is initially performed where the personal computer 1 transmits a START signal to the electronic dictionary 2. When the processor unit 20 of the electronic dictionary 2 executes the second synchronizer software, upon receipt of the START signal from the personal computer 1, the electronic dictionary 2 transmits an acknowledge ACK_START signal to the personal computer 1, thereby establishing a communications link between the personal computer 1 and the electronic dictionary 2. Synchronizing of the first and second name card managing databases can begin at this time.

At the start of the synchronizing operation, the personal computer 1 requests for the second synchronization status tables from the electronic dictionary 2. Upon receipt of the second synchronization status tables from the electronic dictionary 2, the processor unit 10 of the personal computer 1 proceeds to compare the second synchronization status tables with the corresponding first synchronization status tables. Based on the results of the comparison, one of the aforementioned commands is executed such that data is transmitted to or received from the electronic dictionary 2 for updating of either of the first and second name card managing databases.

Particularly, assuming that the first name card managing database was edited to add a new first object data "Jack Qiou," the status identifier (STATUS) of the corresponding first synchronization status table is a DIRTY-SHARED identifier. Since a second object data corresponding to the new first object data is not found in the second name card managing database, the processing unit 10 will be unable to detect a second synchronization status table corresponding to the first synchronization status table of the new first object data. At this time, an updating operation is performed in which the personal computer 1 transmits the new first object data to the electronic dictionary 2, and in which the electronic dictionary 2 is controlled so as to update the second name card managing database with the new first object data received from the personal computer 1 and so as to establish a second synchronization status table for the resulting second object data. The status identifiers of the first and second synchronization status tables are cleared to the CLEAN-SHARED identifier after the first and second object data are synchronized.

Accordingly, assuming that the second name card managing database was edited to add a new second object data "Jack Qiou," the status identifier (STATUS) of the corresponding second synchronization status table is a DIRTY-SHARED identifier since a first object data corresponding to the new second object data is not found in the first name card managing database. The personal computer 1 retrieves the new second object data from the electronic dictionary 2, updates the first name card managing database with the new second object data received from the electronic dictionary 2, and establishes a first synchronization status table for the resulting first object data. The status identifiers of the first and second synchronization status tables are cleared to the CLEAN-SHARED identifier after the first and second object data are synchronized.

If the first object data "Jack Qiou" in the first name card managing database was edited to "Jack Qiu," the status identifier (STATUS) of the corresponding first synchronization status table is changed to a DIRTY-SHARED identifier. Since the second object data "Jack Qiou" in the second name card managing database was not edited, the status identifier (STATUS) of the corresponding second synchronization table remains as a CLEAN-SHARED identifier. Upon comparing the second synchronization status table with the corresponding first synchronization status table of the edited first object data, an updating operation is performed in which the personal computer 1 transmits the edited first object data to the electronic dictionary 2, and in which the electronic dictionary 2 is controlled so as to update the second name card managing database with the edited first object data received from the personal computer 1. The status identifiers of the first and second synchronization status tables are cleared to the CLEAN-SHARED identifier after the first and second object data are synchronized.

Accordingly, assuming that the second object data "Jack Qiou" in the second name card managing database was edited to "Jack Qiu," the status identifier (STATUS) of the corresponding second synchronization status table is changed to a DIRTY-SHARED identifier. Since the first object data "Jack Qiou" in the first name card managing database was not edited, the status identifier (STATUS) of the corresponding first synchronization status table remains as a CLEAN-SHARED identifier. Upon comparing the second synchronization status table with the corresponding first synchronization status table, the personal computer 1 retrieves the edited second object data from the electronic dictionary 2, and updates the first name card managing database with the edited second object data received from the electronic dictionary 2. The status identifiers of the first and second synchronization status tables are cleared to the CLEAN-SHARED identifier after the first and second object data are synchronized.

If the first object data "Jack Qiu" in the first name card managing database was deleted, the status identifier (STATUS) of the corresponding first synchronization status table is changed to a DELETE identifier. Since the second object data "Jack Qiu" in the second name card managing database was not edited, the status identifier (STATUS) of the corresponding second synchronization status table remains as a CLEAN-SHARED identifier. Upon comparing the second synchronization status table with the corresponding first tag table, an updating operation is performed in which the electronic dictionary 2 deletes the second object data "Jack Qiu" from the second name card managing database. The status identifiers of the first and second synchronization status tables are cleared to the CLEAN-SHARED identifier thereafter.

Accordingly, assuming that the second object data "Jack Qiu" in the second name card managing database was deleted, the status identifier (STATUS) of the corresponding second synchronization status table is changed to a DELETE identifier. Since the first object data "Jack Qiu" in the first name card managing database was not edited, the status identifier (STATUS) of the corresponding first synchronization status table remains as a CLEAN-SHARED identifier. Upon comparing the second synchronization status table with the corresponding first synchronization status table, the personal computer 1 deletes the first object data "Jack Qiu" from the first name card managing database. The status identifiers of the first and second synchronization status tables are cleared to the CLEAN-SHARED identifier thereafter.

After the first and second name card managing databases have been synchronized, the communications link between the personal computer 1 and the electronic dictionary 2 is terminated.

Figure 3:
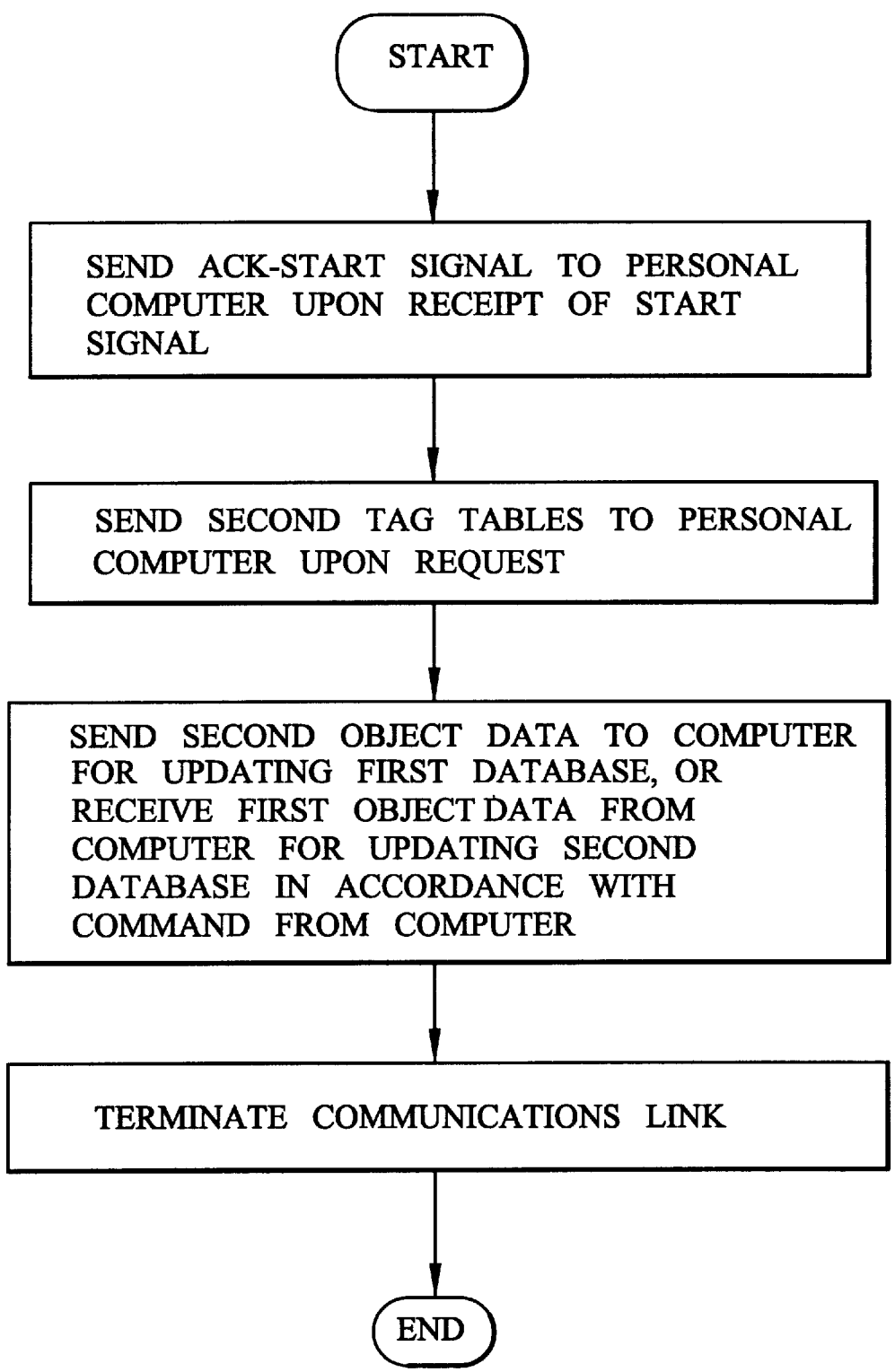
FIG. 3 illustrates the operation of an electronic dictionary when the first and second databases are synchronized according to the computer database synchronization method of this invention.

FIG. 3 illustrates the operation of the electronic dictionary 2 when the first and second name card managing databases are synchronized according to the computer database synchronization method of this invention. When the second synchronizer software of the electronic dictionary 2 is executed by the processor unit 20 while the interface 3 interconnects the personal computer 1 and the electronic dictionary 2, the electronic dictionary 2 waits for the START signal from the personal computer 1. Upon receipt of the same, the electronic dictionary 2 transmits the acknowledge ACK_START signal to the personal computer 1, thereby establishing the communications link between the personal computer 1 and the electronic dictionary 2. Based on the results of the comparison between the first and second synchronization status tables by the personal computer 1, data is transmitted to the electronic dictionary 2 for updating the second name card managing database, or data is retrieved from the electronic dictionary 2 for updating the first name card managing database, thereby synchronizing the first and second name card managing databases in the manner described beforehand. The communications link between the personal computer 1 and the electronic dictionary 2 is terminated after the first and second name card managing databases have been synchronized.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A computer database synchronization method, comprising:

establishing a first database with first object data in a personal computer, and a second database with second object data corresponding to the first object data in an electronic dictionary;

establishing a first synchronization status table for each of the first object data in the personal computer, and modifying the first synchronization status table from a first state, indicating that the corresponding first object data is synchronized with the second database, to a second state, indicating that the corresponding first object data is not synchronized with the second database, when the corresponding first object data is edited;

establishing a second synchronization status table for each of the second object data in the electronic dictionary, and modifying the second synchronization status table from a first state, indicating that the corresponding second object data is synchronized with the first database, to a second state, indicating that the corresponding second object data is not synchronized with the first database, when the corresponding second object data is edited;

establishing a communications link between the personal computer and the electronic dictionary; and synchronizing the first and second databases including controlling the personal computer to retrieve the second synchronization status tables from the electronic dictionary, and to compare the second synchronization status tables with the corresponding first synchronization status tables, when one of the first synchronization status tables is in the first state and the corresponding one of the second synchronization status tables is in the second state, controlling the personal computer to retrieve the corresponding one of the second object data from the electronic dictionary, and to update the first database with the corresponding one of the second object data retrieved from the electronic dictionary, and when one of the first synchronization status tables is in the second state and the corresponding one of the second synchronization status tables is in the first state, controlling the personal computer to transmit the corresponding one of the first object data to the electronic dictionary and controlling the electronic dictionary to update the second database with the corresponding one of the first object data received from the personal computer.

2. The computer database synchronization method as claimed in claim 1, further comprising, after synchronizing the first object data and the corresponding second object data, clearing the first and second synchronization status tables from the second state back to the first state.

3. The computer database synchronization method as claimed in claim 2, further comprising, after synchronizing the first and second databases, terminating the communications link between the personal computer and the electronic dictionary.

4. The computer database synchronization method as claimed in claim 1, wherein the second synchronization status table includes a database identifier, a dictionary-assigned identifier to distinguish the corresponding second object data from the other second object data in the database, and a status identifier to indicate whether the second synchronization status table is in the first or second states.

5. The computer database synchronization method as claimed in claim 4, wherein the first synchronization status table includes a database identifier corresponding to the database identifier of the corresponding second synchronization status table, a computer-assigned identifier to distinguish the corresponding first object data from the other first object data in the first database, the dictionary-assigned identifier of the corresponding second synchronization status table, and a status identifier to indicate whether the first tag table is in the first or second states.

6. The computer database synchronization method as claimed in claim 1, wherein the second state of the first and second synchronization status tables is one of a dirty-shared state, indicating that the corresponding one of the first and second object data is a new object data or a modified object data, and a delete state, indicating that the corresponding one of the first and second object data is a deleted object data.

* * * * *